United States Patent

[11] 3,573,809

[72] Inventor Patrick Magnien
Le Mesnil Saint Denis, France
[21] Appl. No. 729,207
[22] Filed May 15, 1968
[45] Patented Apr. 6, 1971
[73] Assignee Commissariat A L'Energie Atomique
Paris, France
[32] Priority May 19, 1967
[33] France
[31] 107,093

[54] DEVICE FOR ENCODING A LIST OF TERMS
7 Claims, 6 Drawing Figs.

[52] U.S. Cl. .......... 340/365, 178/35, 179/100.3, 179/100.2
[51] Int. Cl. .......... G08c 9/06
[50] Field of Search .......... 340/365, 357, 190, 378; 235/116,122; 178/35, 28, 32, 34, 38; 179/100.2 (Inquired)

[56] References Cited
UNITED STATES PATENTS

| | | | |
|---|---|---|---|
| 2,168,743 | 8/1939 | Paul .......... | 235/122 |
| 2,784,397 | 3/1957 | Branson .......... | 340/190 |
| 3,476,876 | 11/1969 | Myrick .......... | 340/365 |

*Primary Examiner*—Thomas B. Habecker
*Attorney*—Cameron, Kerkam and Sutton

ABSTRACT: A device for encoding a finite list of terms disposed in alphabetical order which comprises in addition to said list a list of encoded indications relating to each of said terms, a system of visual indications of said terms and a system for reading corresponding encoded indications. According to an essential feature, each list is disposed in the form of a spiral of constant pitch on each of the two faces of a single rotary disc, the terms and corresponding encoded indications being located substantially in opposite and back-to-back relation.

INVENTOR

BY

ATTORNEY

DEVICE FOR ENCODING A LIST OF TERMS

The present invention relates to a device for encoding, after visual indication, a finite list of terms disposed in alphabetical order.

The chief aim of this invention is to produce between indications in clear and the encoded indications relating thereto a geometrical correspondence which makes it possible in particular to group in a single moving assembly both the system for visual indication of a term and the system for reading the encoded term.

Said device for encoding a finite list of terms disposed in alphabetical order comprises in addition to said list a list of encoded indications relating to each of said terms, a system of visual indication of said terms and a system for reading corresponding encoded indications. According to an essential feature of said device, each list is disposed in the form of a spiral of constant pitch on each of the two faces of a single rotary disc, the terms and corresponding encoded indications being located substantially in opposite and back-to-back relation. The terms indicated "in clear" and the encoded signals are each marked on a strip which is fixed on the disc, the length of a strip being equal to the pitch of the spiral.

Figure 1:
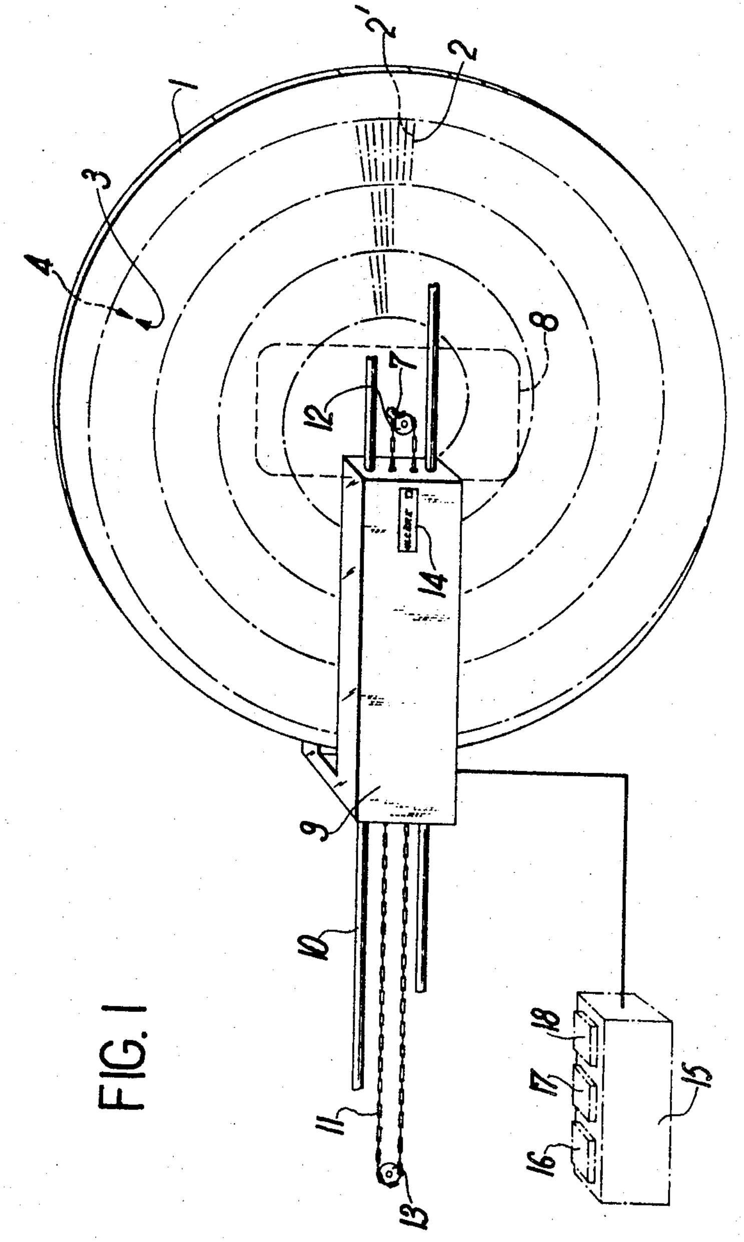
Figure 2A:
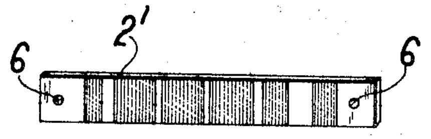
Figure 2B:
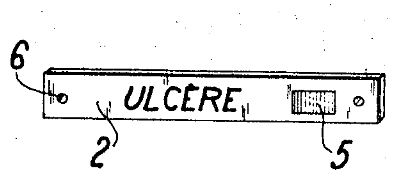
Figure 3A:
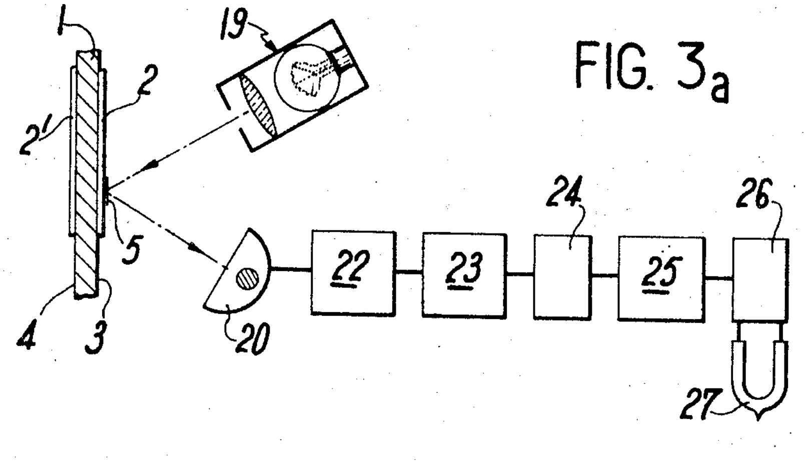
Figure 3B:
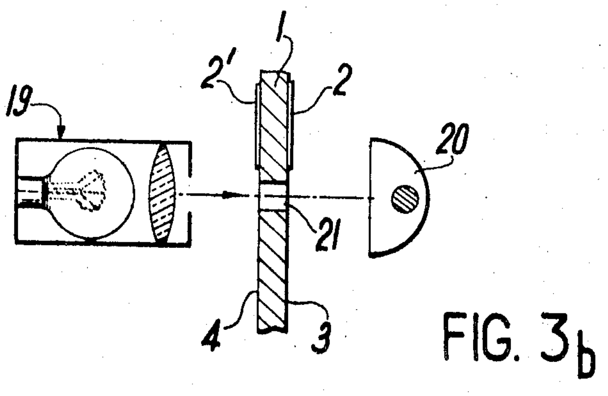
Figure 4:
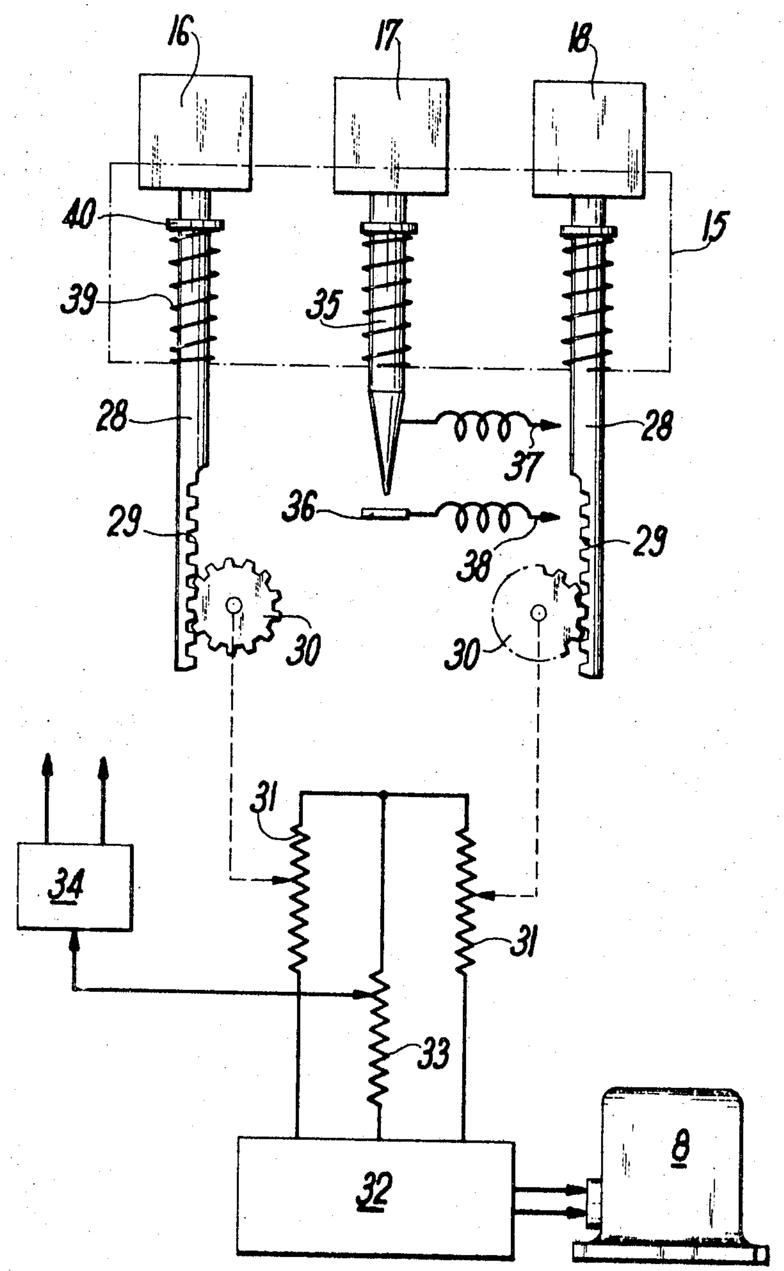

Further advantages and properties of the present invention will become apparent from the description which now follows below, reference being made to the accompanying drawings in which one embodiment of the device according to the invention is given by way of explanation but not in any sense by way of limitation, and in which:

FIG. 1 is a diagrammatic illustration of the encoding device according to the invention;

FIGS. 2*a* and 2*b* illustrate a pair of strips, the term to be searched being marked in clear on one strip whilst the digit code of said term is marked in binary language on the other strip;

FIGS. 3*a* and 3*b* illustrate two stroboscopic systems which are designed to facilitate visual detection of the terms by the operator; and FIG. 4 illustrates the control assembly of the device according to the invention.

From FIG. 1, it is apparent that the encoding device according to the invention comprises a metallic disc 1, two series of strips 2 and 2' of identical shape which correspond to each other in pairs being fixed on the two faces of said disc in the form of a regular spiral, each strip of the front face 3 being mounted in opposite and back-to-back relation to the corresponding strip of the rear face 4. The length of the strips is equal to the pitch of the spiral.

Said strips are shown in detail in FIGS. 2*a* and 2*b*. The term to be searched in the list (such as, for example, ULCER) is marked in printed characters on the strips 2 (shown in FIG. 2*b*) which are disposed on the front face of the disc 1, said strips 2 being also provided with a photoelectric reference mark 5 (for example, a mark which is coated with white paint) having a substantially rectangular shape. Said strips are disposed on the spiral in the alphabetical order of the different terms of the list.

The strips 2' (shown in FIG. 2*a*) which are fixed on the rear face of the disc 1 are provided in binary language with the digit code of the term which is marked on the corresponding strip of the front face 3. Said strips can be obtained by photogravure. Holes pierced at right angles through the disc 1 are adapted to receive common members for fastening two corresponding strips 2 and 2' (as shown diagrammatically at 6) which are thus mounted in strictly opposite and back-to-back relation.

The disc 1 can be driven in rotation about the spindle 7 either in one direction or the other by means of an electric motor 8. A carriage 9 having the shape of a U, the two arms of which are placed on each side of the disc 1, is capable of radial displacement with respect to said disc along guides 10. Said radial displacement is obtained by means of an endless chain 11 which is attached to the carriage at one point and driven by means of a sprocket 12 which is rigidly fixed to the disc spindle 7. The sprocket 13 is mounted to rotate freely.

The carriage arm which is located in front of the front face 3 of the disc is pierced by an optical window 14, the dimensions of which must make it possible to read the terms marked on the strips 2.

The carriage arm which is placed in front of the rear face 4 of the disc is also provided at the same point as the opposite arm with a window (not shown in FIG. 1) which is equipped with a bank of photoelectric cells each associated with an illumination lamp. The intended function of these different cells is to read the coded strips 2'.

The diameter of the drive sprocket 12 is calculated so that the circumference thereof is equal to the pitch of the spiral. Thus, the optical windows for direct reading and for reading by photoelectric cell are always located in front of the passing strips.

The key box which is shown in FIG. 1 at 15 constitutes the device for controlling the rotation of the discs in both directions and printing the results. The forward motion of the disc 1 is controlled by the key 16 whilst the reverse motion of the disc is controlled by the key 18. The speed of rotation is proportional to the extent of downward displacement of the keys. Printing of the results is controlled by the central key 17. A detailed description of these different elements will be given hereinafter.

FIGS. 3*a* and 3*b* show two stroboscopic systems which can advantageously be employed to facilitate visual detection of the terms by the operator.

In FIG. 3*a*, the photoelectric reference mark 5 disposed at the extremity of each printed-character strip 2 which is fixed on the front face 3 of the disc 1 is illuminated by a lamp 19. The reference mark 5 is read by reflection by means of a photoelectric cell 20. The pair of elements consisting of lamp 19 and cell 20 must follow the motion of the strips along the spiral path and must be secured to the carriage 9 itself.

In FIG. 3*b*, the photoelectric reference mark 5 is replaced by a hole 21 which is pierced in the disc 1 at the end of each pair of strips 2 and 2'. In this form of construction, the lamp 19 is fixed on one of the arms of the carriage 9 whilst the photoelectric cell 20 is secured to the other arm so that the lamp, the cell and each hole 21 are thus aligned along a common axis.

The electric signal which is delivered by the photoelectric cell 20 at the time of transition of a reference mark 5 or of a hole 21 is first amplified at 22, then drives a variable-threshold flip-flop circuit 23 in order to effect any necessary corrections according to the variations in ambient luminosity. The pulses are then shaped at 24, penetrate into a variable-delay circuit 25, and finally trigger the synchronization circuits of a current generator 26 which supplies a flash tube 27. An assembly of this type makes it possible to synchronize the rate of forward motion of the strips with the flash tube 27, with the result that the first letters of the moving terms are stabilized by stroboscopy at high speeds of rotation of the disc 1.

The variable-delay circuit 25 permits the stroboscopic framing of the strips which are immobilized by means of the flashes. For this purpose, the moment of the flash is displaced in phase with respect to the mean position of the photoelectric reference marks 5 or of the holes 21. The geometrical positions of said reference marks and of said holes must be such that the entire angular width of a strip can be swept.

FIG. 4 illustrates the control assembly of the device according to the invention. The key box 15 is fitted with three control keys 16, 17 and 18.

The forward-motion key 16 and reverse-motion key 18 control the speed of rotation of the motor 8 which drives the disc 1, said speed being proportional to the extent of downward displacement of the keys.

To this end, each key 16 and 18 is rigidly fixed to a substantially vertical rod 28 at the lower end of which is formed a rack 29 for the purpose of driving a pinion 30 which is intended to actuate the movable contact of a potentiometer 31. The two potentiometers 31 are connected on the one hand to each other and on the other hand to an electronic speed-changing device 32 which is coupled to the motor 8, the arrangement being such that each potentiometer controls a different direction of rotation of the motor.

A fraction of the current which is common to the potentiometers 31 and which is adjustable by means of a potentiometer 33 can serve to produce the continuous transition from stroboscopic illumination of the strips to continuous illumination by producing action on a variable-threshold relay 34, depending on the extent of downward displacement of the control keys 16 and 18, that is to say according to the direction of rotation of the motor. Thus, whereas it is possible at high speeds of rotation to read only the fist letter of the moving terms, it is possible at low speed to carry out the reading operations in strip-by-strip sequence.

By applying the rod 35 in contact with the metallic strip 36, the key 17 which is identical with the keys 16 and 18 causes the current to flow through the conductors 37 and 38 and the encoded signal which is read by the bank of photoelectric cells is delivered via said conductors in the direction of the peripheral elements. Said key is locked as a result of the interaction of the two other keys by virtue of a mechanism which is not illustrated in FIG. 4.

Automatic return of the control keys is carried out by means of springs such as the spring 39 which are disposed around the different operating rods and which are applied at one end against the frame of the box 15 and at the other end against bearing flanges 40.

The operation of the device according to the invention will now be described, assuming by way of example that it is desired to search the word ULCER in a finite list of terms disposed in alphabetical order along the spiral in such a manner as to transmit to the peripheral elements the encoded indications which relate to this term.

When the device is in the inoperative condition, the strip which appears behind the window 14 bears, for example, the term ANGINA; the operator then depresses the forward-motion key 16 so as to cause all the terms of the list to move forward until the required term is found. The stroboscopic system serves to visualize the first letter of these different terms. When the letter U appears, the operator raises the key 16 so as to initiate the transition to continuous illumination. The progression of the strips may then be followed step-by-step until the word ULCER appears in the window 14. Then, by pressing the key 17, the operator transmits to the peripheral elements the encoded indications which relate to this term.

As has already become apparent, the present invention has been described in the foregoing by way of explanation but not in any limiting sense and any detail modifications may thus be contemplated without thereby departing from the scope of the invention.

For example, it will be readily understood that the code marked on the strips which are fixed on the rear face of the disc can also be marked in accordance with the magnetic recording technique. In addition, a closed-circuit television chain can enable the operator to view the optical window while controlling the machine by means of a remote control system. The photoelectric reference marks can be provided both on the front-face strips and on the rear-face strips.

Finally, if the differences in the rate of transfer of the peripheral strips and central strips are too great, it is possible to correct the threshold of transition of illumination by means of another potentiometer which is driven by the carriage-displacement chain according to the pitch of the spiral.

I claim:

1. A device for coding a finite list of terms comprising a rotary disc, a list of terms in alphabetical order disposed on a side of said disc in a spiral of constant pitch, a list of coded indications relating to each of said terms disposed on the other side of said disc in a spiral of constant pitch, each term and encoded indications being located substantially opposite and in back to back relation on said disc, means for selectively viewing said terms, means for reading the corresponding encoded indications and means for rotating said disc for selecting a desired term.

2. A device according to claim 1, the terms and the encoded indications being marked on strips fixed on said disc, the length of each of said strips being substantially equal to the pitch of the spiral.

3. A device according to claim 1, said means for rotating said disc providing rotation in both directions about the center of said disc including a motor keys for actuating said motor, the speed of rotation of said motor being proportional to the extent of downward displacement of said keys.

4. A device according to claim 1, said means for viewing said terms and said means for reading corresponding encoded indications including a carriage for radial displacement with respect to said disc, two arms disposed on each side of said disc, a window in each of said arms, elements for reading said encoded indications on one of said arms, and mechanism for driving said carriage for constant centering of said windows with said terms and with said indications.

5. A device according to claim 4, said mechanism including an endless chain secured to said carriage at one point and a sprocket for driving said chain rigidly fixed to the center of said disc, said sprocket having a circumference which is equal to the pitch of the spiral of said lists.

6. A device according to claim 1, including a stroboscopic assembly stabilizing the first letter of the moving terms at high speeds of rotation of said disc.

7. A device according to claim 1, including automatic means for continuous transition from stroboscopic illumination to continuous illumination of said terms as the speed of rotation of said disc decreases.